(12) United States Patent
Shpak

(10) Patent No.: US 11,294,024 B2
(45) Date of Patent: Apr. 5, 2022

(54) SYSTEM, APPARATUS, AND/OR METHOD FOR DETERMINING A TIME OF FLIGHT FOR ONE OR MORE RECEIVERS AND TRANSMITTERS

(71) Applicant: Deeyook Location Technologies Ltd., Tel Aviv (IL)

(72) Inventor: Eran Shpak, Tel Aviv (IL)

(73) Assignee: Deeyook Location Technologies Ltd., Tel Aviv (IL)

( * ) Notice: Subject to any disclaimer, the term of this patent is extended or adjusted under 35 U.S.C. 154(b) by 127 days.

(21) Appl. No.: 16/814,356

(22) Filed: Mar. 10, 2020

(65) Prior Publication Data
US 2021/0286043 A1    Sep. 16, 2021

(51) Int. Cl.
*G01S 5/12* (2006.01)
*G01S 5/02* (2010.01)

(52) U.S. Cl.
CPC .............. *G01S 5/12* (2013.01); *G01S 5/0221* (2013.01)

(58) Field of Classification Search
None
See application file for complete search history.

(56) References Cited

U.S. PATENT DOCUMENTS

| 6,587,811 | B2 | 7/2003 | Schleifer et al. |
| 9,814,051 | B1 | 11/2017 | Shpak |
| 10,182,315 | B2 | 1/2019 | Shpak |
| 2016/0277888 | A1* | 9/2016 | Niesen ................ H04L 43/0852 |
| 2017/0090026 | A1 | 3/2017 | Joshi et al. |
| 2017/0223496 | A1* | 8/2017 | Frydman .................. G01S 5/04 |
| 2017/0367065 | A1 | 12/2017 | Seth et al. |

FOREIGN PATENT DOCUMENTS

| DE | 102017101854 A1 | 8/2018 |
| WO | 2016058552 A1 | 4/2016 |
| WO | 2017023474 A1 | 2/2017 |
| WO | 2017136654 A2 | 8/2017 |

OTHER PUBLICATIONS

International Search Report dated May 28, 2021 for PCT Appn No. PCT/IB2021/051666 filed Feb. 28, 2021, 15 pgs.

* cited by examiner

*Primary Examiner* — Whitney Moore
(74) *Attorney, Agent, or Firm* — Brooks Kushman P.C.

(57) ABSTRACT

In at least one embodiment, a system for wireless communication is provided. The system includes a first transceiver and a first mobile device. The first mobile device includes the first transceiver and is programmed to receive a first wireless signal and a second wireless signal and to process the first wireless signal and the second wireless signal based on a first internal clock associated with the first mobile device. The first mobile device is further programmed to determine a time of arrival (TOA) of the first wireless signal to provide a first TOA signal and to determine the TOA of the second wireless signal to provide a second TOA signal. The first mobile device is further programmed to obtain a difference between the first TOA signal and the second TOA signal to provide a first difference TOA signal that is independent of the first internal clock.

21 Claims, 8 Drawing Sheets

SYSTEM, APPARATUS, AND/OR METHOD FOR DETERMINING A TIME OF FLIGHT FOR ONE OR MORE RECEIVERS AND TRANSMITTERS

TECHNICAL FIELD

Aspects disclosed herein generally relate to system, apparatus, and method for providing wireless communication. Specifically, embodiments disclosed herein also generally relate one or more mobile devices configured to determine a cyclic delay diversity time of flight (TOF) for mobile transmitters. These aspects and others will be discussed in more detail herein.

BACKGROUND

U.S. Publication No. 2017/0367065 to Seth et al. ("Seth") discloses systems and methods for determining locations of wireless nodes in a network architecture. In one example, an asynchronous system includes a first wireless node having a wireless device with one or more processing units and RF circuitry for transmitting and receiving communications in the wireless network architecture including a first RF signal having a first packet. The system also includes a second wireless node having a wireless device with a transmitter and a receiver to enable bi-directional communications with the first wireless node in the wireless network architecture including a second RF signal with a second packet. The one or more processing units of the first wireless node are configured to execute instructions to determine a coarse time of flight estimate of the first and second packets and a fine time estimate of the time of flight using channel information of the first and second wireless nodes.

U.S. Pat. No. 6,587,811 to Schleifer et al. ("Schleifer") discloses a circuit that generates a test signal useful in verifying the actual delay values of individual delay stages in a digital delay line. In general, the cumulative delay of the delay line defines a window in time having its zero point anchored to the beginning of the delay line. Successive delay stages correspond to successive time bins within the overall time window. The test signal shifts at a known, linear rate in time with respect to a reference signal, which is used to initiate a test cycle. The reference signal synchronizes sampling of the test signal to the beginning of the time window. Samples of the test signal are taken at sample points determined by the actual time delays in the successive delay stages. The observed distribution of test signal edges across the time window may be used to determine the actual delay intervals of the delay line.

German publication DE102017101854A1 to Gumbmann et al. ("Gumbmann") provides a method of detecting garment reflections is described in which a pulsed radar signal is emitted which strikes an object to be examined. The pulsed radar signal comprises at least two signal pulses of different center frequency. The reflection spectrum of the pulsed radar signal is detected and evaluated. Furthermore, a device for detecting clothing reflections is described.

U.S. Publication No. 2017/0090026 to Joshi et al. ("Joshi") discloses techniques for a motion tracing device using radio frequency signals are presented. The motion tracing device utilizes radio frequency signals, such as WiFi to identify moving objects and trace their motion. Methods and apparatus are defined that can measure multiple WiFi backscatter signals and identify the backscatter signals that correspond to moving objects. In addition, motion of a plurality of moving objects can be detected and traced for a predefined duration of time.

SUMMARY

In at least one embodiment, a system for wireless communication is provided. The system includes a first transceiver and a first mobile device. The first mobile device includes the first transceiver and is programmed to receive a first wireless signal and a second wireless signal from a first transmitter and a second transmitter, respectively, and to process the first wireless signal and the second wireless signal based on a first internal clock associated with the first mobile device. The first mobile device is further programmed to determine a time of arrival (TOA) of the first wireless signal to provide a first TOA signal and to determine the TOA of the second wireless signal to provide a second TOA signal. The first mobile device is further programmed to obtain a difference between the first TOA signal and the second TOA signal to provide a first difference TOA signal that is independent of the first internal clock.

In at least another embodiment, a method for wireless communication is provided. The method includes receiving, at a first mobile a first wireless signal and a second wireless signal from a first transmitter and a second transmitter, respectively, and processing the first wireless signal and the second wireless signal based on a first internal clock associated with the first mobile device. The method further includes determining a time of arrival (TOA) of the first wireless signal to provide a first TOA signal and determining the TOA of the second wireless signal to provide a second TOA signal. The method further includes obtaining a difference between the first TOA signal and the second TOA signal to provide a first difference TOA signal that is independent of the first internal clock.

In at least another embodiment, a computer-program product embodied in non-transitory computer readable medium that is programmed for wireless communication is provided. The computer-program product includes instructions to receive, at a first mobile a first wireless signal and a second wireless signal from a first transmitter and a second transmitter, respectively, and to process the first wireless signal and the second wireless signal based on a first internal clock associated with the first mobile device. The computer-program product includes instructions to determine a time of arrival (TOA) of the first wireless signal to provide a first TOA signal and to determine the TOA of the second wireless signal to provide a second TOA signal. The computer-program product includes instructions to obtain a difference between the first TOA signal and the second TOA signal to provide a first difference TOA signal that is independent of the first internal clock.

In at least another embodiment, a system for wireless communication is provided. The system includes a first mobile device, a second mobile device, and a server. The first mobile device is programmed to receive a first wireless signal and a second wireless signal from a first transmitter and a second transmitter, respectively and to determine a time of arrival (TOA) of the first wireless signal to provide a first TOA signal. The first mobile device is further programmed to determine the TOA of the second wireless signal to provide a second TOA signal. The second mobile device is programmed to determine a time of arrival (TOA) of the first wireless signal to provide a third TOA signal and to determine the TOA of the second wireless signal to provide a fourth TOA signal. The server is programmed to receive first information corresponding to the first TOA signal and to the second TOA signal from the first mobile device and to receive second information corresponding to the third TOA signal and to the fourth TOA signal from the second mobile device. The server is further programmed to identify a location of the first mobile device based on at least the first information and the second information, and on at least known locations of the second mobile device, the first transmitter, and the second transmitter. The server is further programmed to identify a location of the first transmitter based on at least the first information and the second information, and on at least known locations of first mobile device, the second mobile device, and the second transmitter.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
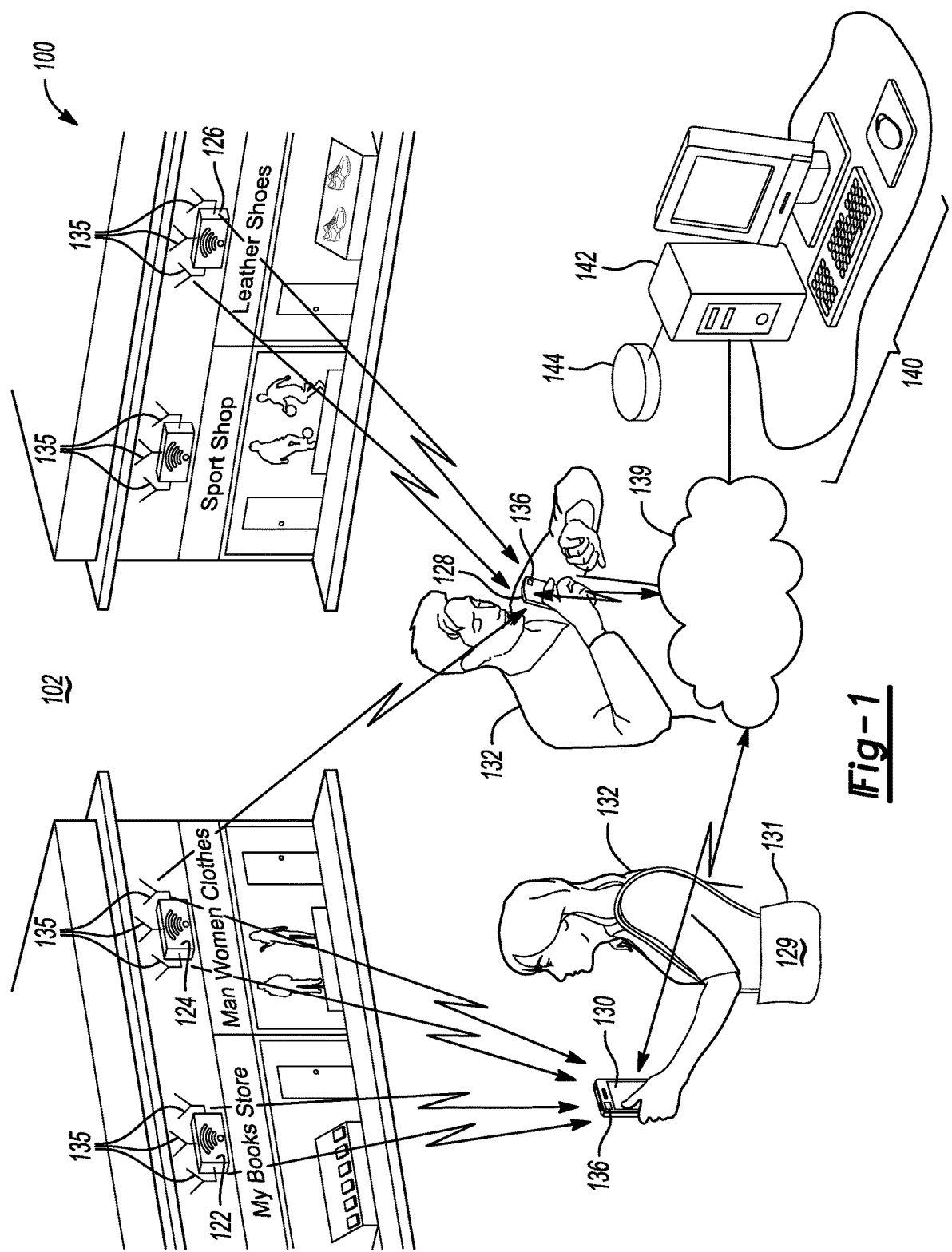
FIG. 1 depicts an example of a wireless communication system in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that at least one controller as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the at least one controller as disclosed herein utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The disclosed controller(s) also include hardware-based inputs and outputs for receiving and transmitting data, respectively from and to other hardware-based devices as discussed herein.

Aspects disclosed herein may generally provide for, but not limited to, an apparatus (or receiver device), system and/or method to accurately estimate the location of wireless sensors (e.g., mobile device, location tags, or any other suitable devices that receive signals from wireless access points (e.g., transmitters) from various wireless communication protocols such as WiFi, and/or one Long-Term Evolution (LTE) (including 5G), etc. based on a Time of Flight (ToF) principles. The disclosed receiver device may be passive receivers, the transmitters that transmit information of the passive receivers via the foregoing wireless communication protocols may be access points and/or mobiles devices that are designed, manufactured, and deployed for the purpose of providing communication. The transmitters may be unmodified devices that are formed via hardware and software. In general, the disclosed receiver devices may operate in pairs, with each being required to receive packets from transmitter pairs, for example, on different channels, and for example, using different protocols (such as but not limited to: (1) both protocols being WiFi, (2) one protocol being WiFi and the other being LTE). The receiver devices may need backhaul connectivity, albeit potentially of poor quality. Target accuracy of 60 cm far may exceed a large decorrelation time of typical channels (e.g., 20 MHz), given the speed of light and given poor end point clock tolerance, (e.g., typically $10^{-4}$.) The disclosed receiver device provides, but not limited to: (1) a unique propagation time measurement scheme that may overcome both clock skews and/or clock drifts, (2) an time of arrival estimation, in a coarse and/or fine implementation that may be fine in time and fine in frequency. While aspects noted below may be based on WiFi terminology, it is contemplated that the disclosure as set forth herein may also apply to LTE including 5G.

FIG. 1 depicts an example of a wireless communication system 100 in accordance to one embodiment. For example, FIG. 1 may illustrate an indoor or urban environment 102, in which multiple access points 122, 124, 126 are deployed, often by different Wireless Local Area Network (WLAN) or LTE proprietors independently of one another. It is recognized that the number of access points 122, 124, 126 may vary. Signals from the access points 122, 124, 126 may be received by mobile devices 128, 130 that are operated by users 132 who are free to move around within environment. Again, it is recognized that the number of mobile devices 128, 130 within the illustrated environment may vary. While not expressly illustrated in FIG. 1, it is recognized that the mobile device 128 may correspond to any one or more of a cellular phone, tablet, laptop, etc. It is recognized that the mobile device 128 may also correspond to a location tag 131 that includes a wireless transceiver that is arranged for attachment to an object 129. For example, the object 129 may correspond to a women's handbag (or purse) and the location tag 131 may provide information indicative of the location of the handbag 129. The location tag 131 may transmit information corresponding to the location of the object to one or more access points 122, 124, 126 and/or to at least one server 140. Each mobile device 128, 130 generally includes a MODEM or other apparatus for enabling wireless communication with the various access points 122, 124, 126 in the environment.

Assuming, for example, that the access points 122, 124, 126 in system 100 are compliant with the 802.11n standard (e.g., WiFi based standard), each access point 122, 124, 126 may include two or more antennas 135. The mobile devices 128, 130 may each be assumed to have a single, omnidirectional antenna 136 to communicate with the access points 122, 124, 126. In general, the mobile devices 128, 130 may process signals received from antennas 135 to determine the location of any one or more of the respective access points 122, 124, 126. Additionally, the mobile devices 128, 130 may operate in pairs to determine their location relative to the access points 122, 124, 126

The mobile devices 128, 130 may associate with any one or more of access points 122, 124, 126 for purposes of Internet communications. Alternatively or additionally, the mobile devices 128, 130 may access the Internet via a cellular network or other connection. In any case, the mobile devices 128, 130 may communicate access point identification and/or a location of the one or more access points 122, 124, 126 via a network 139 to the mapping server 140.

In one example, the mobile devices 128, 130 may communicate their current location coordinates to the access points 122, 124, 126 and the mapping server 140 (or base stations (not shown)), as derived from a time of arrival implementation that will be described in more detailed below based on signals transmitted from the access points 122, 124, 126 or base stations (not shown) that are provided by the server 140. This information may be collected and reported autonomously and automatically by a suitable application program ("app") that is executed in hardware on the mobile devices 128, 130. The server 140 typically comprises a general-purpose computer, comprising a programmable processor 142 and a memory 144. The functions of the server 140 that are described herein are typically implemented in software running on a processor 142, which may be stored on tangible, non-transitory computer-readable media, such as optical, magnetic or electronic memory media.

Based on the location coordinates communicated over network 139 by the mobile devices 128, 130; the processor 142 may build a map of access point locations and orientations in the memory 144. As a greater number the mobile devices 128, 130 are employed, such mobile devices 128, 130 may convey information to the server 140. In this instance, the map may grow in both geographic extent and accuracy of the access point data, by a process of bootstrapping from an initial base of seed information. Based on the map, the server 140 may also provide location and navigation information to users 132 via the application program when executed on their respective mobile devices 128, 130 based on the access point signals received by the mobile devices 128, 130 at any given time.

Through the utilization of the time of arrival implementation referred to above, the system 100 may determine the location of an unknown receiver (e.g., determine the location of mobile device 128, 130 including the location tag 129) if the location of three transmitters are known (e.g., the transmitters may correspond to the two stationary access points 122, 124, 126 (or base stations) and a receiver that may or may not be stationary such as the mobile device 128 (or location tag 129). Similarly, in another example, the system 100 may determine the location of an unknown transmitter through the utilization of the time of arrival. In this case, if the location of two mobile devices 128, 130 are known and the location of two stationary transmitters such as the access points 122, 124, 126 are known, the system may determine location of an unknown transmitter that may correspond to another access point 122, 124, 126 or another mobile device 128, 130.

Figure 2:
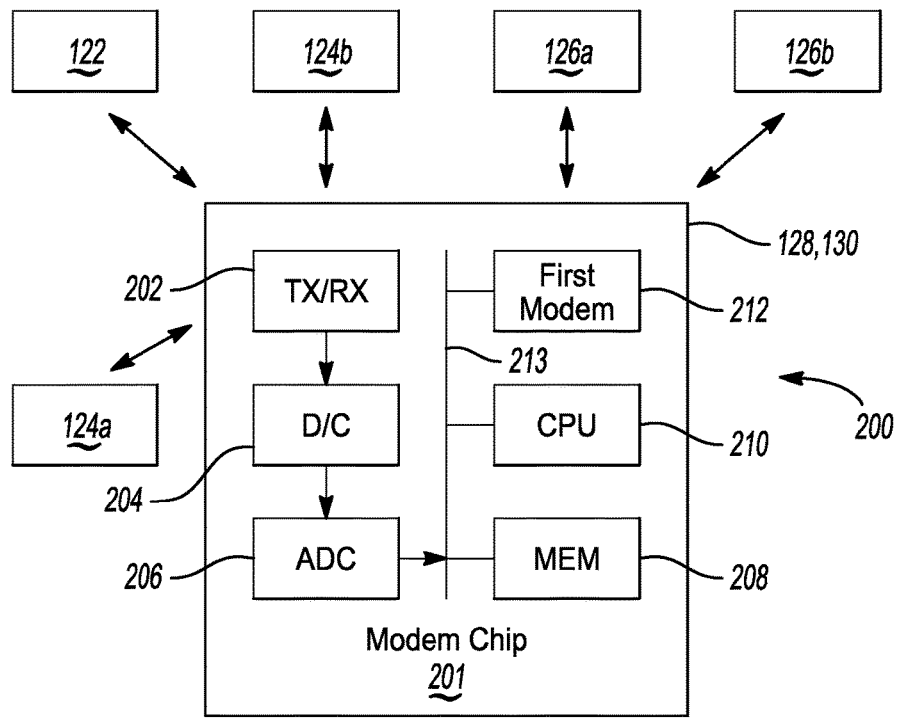
FIG. 2 depicts an apparatus that may be implemented in the wireless communication system of FIG. 1 in accordance to one embodiment.

FIG. 2 depicts an apparatus 200 that may be implemented in the wireless communication system 100 of FIG. 1 to provide a location tag in accordance to one embodiment. For purposes of description, it can be assumed that the access point 122 may communicate with the mobile device 128 (or 130 (including the location tag 129)) (hereafter "128" for brevity) over a first communication network (e.g., WIFI network A, channel 1 @ 2.4 GHz), that the access points 124a and 124b may communicate with the mobile device 128 over a second communication network (e.g., WIFI network B @channel 6 @2.4 GHz), that the access point 126a may communicate with the mobile device 128 over a third communication network (e.g., LTE network A @ 1.9 GHz) and that the access point 126b may communicate with the mobile device 128 over a fourth communication network (e.g., LTE network B @ 1.9 GHz).

The mobile device 128 generally includes a modem 201 (or modem chip (e.g., integrated chip (IC), etc.)). The modem 201 generally facilitates converting analog information as received from the access points 122, 124, 126 into digital information. The modem 201 includes a transceiver 202, a downconverter 204, an analog to digital converter 206, memory 208, and at least one central processing unit (CPU) (or at least one controller) 210. A dedicated modem chip 212 (or sub-modem) may also be provided on the modem 201. In this case, the dedicated modem chip 212 may correspond to, for example, an LTE based modem to enable communication with the various LTE based networks or associated access points. A bus 213 facilitates the transmission of data between the ADC 206, the memory 208, the controller 210, and the first modem 212.

It is recognized that the modem 201 generally facilitates communication, for example, any number of communication networks (e.g. WiFi and LTE based networks). In general, the mobile device 128 may utilize the controller 210 along with additional aspects illustrated in FIG. 2 to perform the time of arrival implementation which will be described in more detail in connection with any one or more the FIGUREs noted below. Likewise, the controller 210 may utilize the controller 210 and additional aspects illustrated in FIG. 2 to perform the additional aspects disclosed in any one or more of the FIGUREs noted below.

Propagation Time Measurement Scheme

Determining the Location of a Receiver

Figure 3:
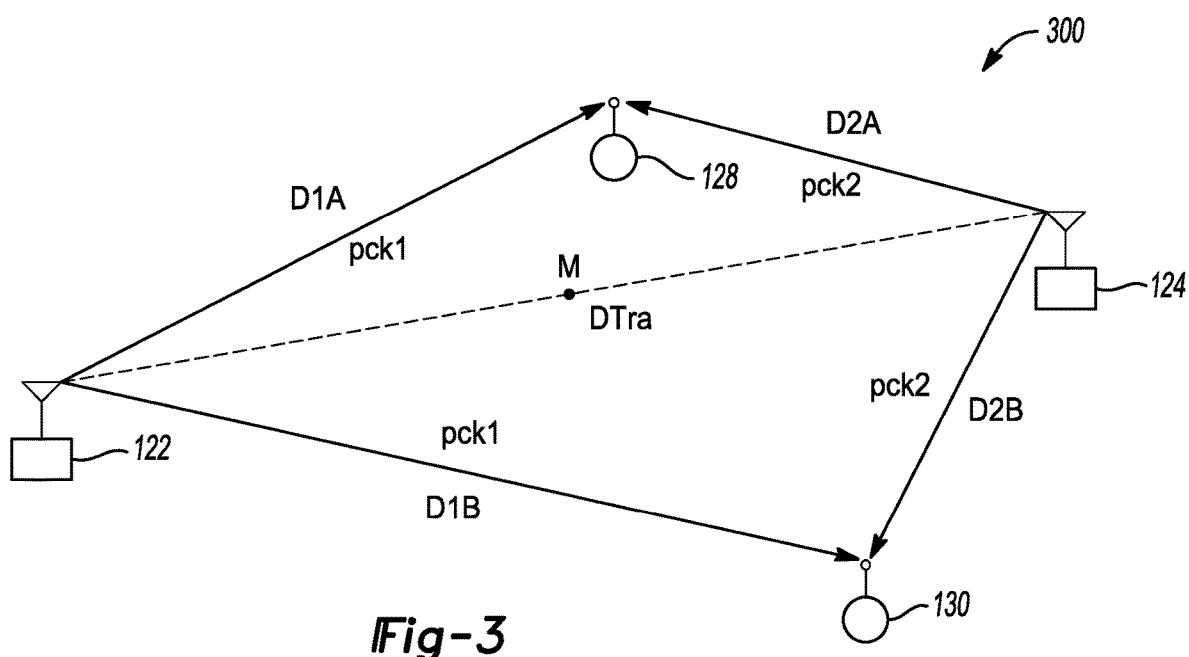
FIG. 3 generally depicts a first system for determining the location of any one of the mobile devices relative to the access points in accordance to one embodiment.

FIG. 3 generally depicts a first system 300 for determining the location of any one of the mobile devices 128 or 130 relative to the access points 122, 124, 126 in accordance to one embodiment. In the example identified with the first system 300, the access points 122, 124, 126 may generally be defined as transmitters 122, 124, 126 and the mobile devices 128, 130 may generally be defined as receivers 128, 130. The location of the receiver 128 or 130 and the location of the transmitters 122, 124, 126 are known prior to determining the location of the other receiver 128 or 130. The mobile device 128, 130 cooperate in pairs such that each mobile device 128, 130 determines its corresponding location. It is recognized that the mobile device 128, 130 may be passive in that such devices 128, 130 may simply determine their respective locations based on transmissions from the access points 122, 124, 126 and that it may not be necessary for the mobile devices 128, 130 to transmit data to the access points 122, 124, 126 in order to determine their respective positions.

The transmitters 122, 124, 126 (e.g., the access points 122, 124, 126) and the receivers (e.g., the mobile devices 128, 130) may employ autonomous, inaccurate clocks. In other words, each of the transmitters 122, 124, 126 and the receivers 128, 130 employ controllers 210 that operate at different clocks (or clock cycles). In order to overcome the inaccurate clocks, the receivers 128, 130 operate in pairs such that each of the receivers 128, 130 receive a first packet (e.g., PCK1) from the transmitter 122 and a second packet (e.g., PCK2) from the transmitter 124. It is recognized that the receivers 128, 130 receive the second packet PCK2 shortly after such receivers 128, 130 receive the first packet PCK1. The following explanation employs a pair of transmitters that transmit information. In FIG. 3, a total of three transmitters 122, 124, and 126 are illustrated. Thus, the below process is employed for each pair of transmitters (e.g., first pair of transmitters 122, 124, second pair of transmitters 122, 126, and third pair of transmitters 124, 126). This will be discussed in more detail in connection with FIG. 6.

The receiver 128 estimates the time of arrival of the first packet PCK1 and the second packet PCK2 utilizing its own internal clock based on the following:

$$t_{pck1} + \frac{D_{1A}}{c} + t_A \text{ and } t_{pck2} + \frac{D_{2A}}{c} + t_A$$

for PCK1 and PCK2, respectively. (Eq. 1).

The receiver 128 calculates (or determines) the first difference in time of arrival (e.g., first difference) between the first packet PCK1 and the second packet PCK2 based on the following:

$$\Delta t_A = t_{pck2} - t_{pck1} + \frac{D_{2A} - D_{1A}}{c}$$

which is independent of local receiver clock $t_A$ for the receiver 128, where c corresponds to the speed of light. (Eq. 2).

Similarly, the receiver 130 estimates the time of arrival of the same first packet PCK1 and the same second PCK2 utilizing its own internal clock based on the following:

$$t_{pck1} + \frac{D_{1B}}{c} + t_B \text{ and } t_{pck2} + \frac{D_{2B}}{c} + t_B$$

for PCK1 and PCK2, respectively. (Eq. 3)

The receiver 130 calculates (or determines) the difference in time of arrival (e.g., the second difference) between the first packet PCK1 and the second packet PCK2 based on the following:

$$T_B (\text{or } \Delta t_B) = t_{pck2} - t_{pck1} + \frac{D_{2B} - D_{1B}}{c}$$

which is independent of local receiver clock $t_B$ for the receiver 130. (Eq. 4).

Therefore, the final difference between the first difference and the second difference may be found as follows:

$$\Delta t_{BA} = \Delta t_B - \Delta t_A = \frac{(D_{2B} - D_{1B}) - (D_{2A} - D_{1A})}{c}. \quad \text{(Eq. 5)}$$

Figure 4:
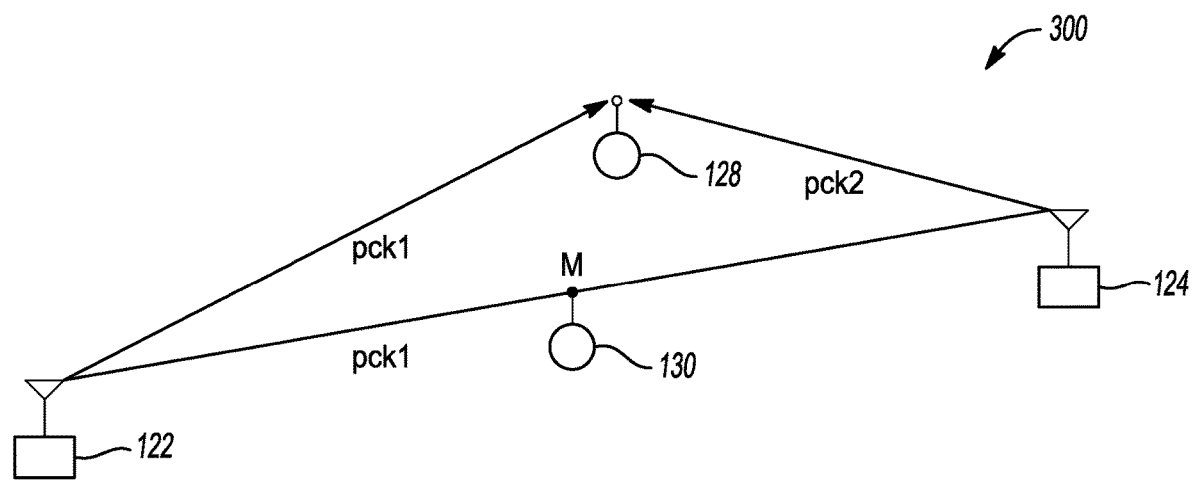
FIG. 4 generally depicts another aspect related to the first system for determining the time of arrival in accordance to one embodiment.

FIG. 4 generally depicts another aspect related to the first system 300 for determining the time of arrival in accordance to one embodiment. FIG. 4 illustrates that the receiver 130 is positioned at a location that is half-way between the transmitter 122 and the transmitter 124. In general, the second difference (see. Eq. 5) as determined by the receivers 128, 130 is generally equal to a time difference between the transmitted first and second packets (e.g., PCK1 and PCK2) since a propagation delay from the transmitters 122, 124 to the receiver 130 are similar (e.g., $D_{1A}=D_{2A}$). It is recognized that the embodiment illustrated in FIG. 3 is a general case and the embodiment illustrated in FIG. 4 corresponds to a particular case.

The receiver 128 transmits information corresponding to the time difference between the transmitted first and second packets (e.g., PCK1 and PCK2) to the receiver 130 and/or to the server 140. In one example, the receiver 128 transmits such information to the receiver 130 over a potentially poor-quality network. In other words, the receivers 128, 130 share their respective readings over a backhaul which may be of a high, unpredictable latency. In general, there may not be any out of the ordinary requirements from the backhaul for the first system 300 to operate as intended. For example, a Narrowband Internet of Things (NB-IoT) or Long-Evolution (LTE) data network may operate well in the first system 300. The receiver 130 subtracts the time difference between PCK1 and PCK2 sent by the transmitters 122, 124 respectively as reported by the receiver 128 from its measured time difference. To summarize, the first difference and the second difference performed by the receivers 128, 130, eliminates the unknown local clock skew in the receivers 128, 130. The third difference (or the difference of the differences) eliminates the unknown clock skew between the transmitters 122, 124. The residue is proportional to propagation delays only.

In general, in the case in which the location of the transmitters 122, 124 and the receiver 128 is known, and hence, $D_{2A}-D_{1A}$ and $D_{Tra}=D_{21}$ are known, the receiver 128 transmits $\Delta t_A$ (e.g., the time difference between the first packet (PCK1) and the second packet (PCK2) as transmitted from the transmitters 124 and 126 and received at the receiver 128) to the receiver 130 or server 140 which forwards the reading to the receiver 130. The receiver 130 measures $\Delta t_B$ (e.g., the time difference between the first packets (PCK1) and the second packets (PCK2) as transmitted from the transmitters 122 and 124 and received at the receiver 130) and as per Eq. 5 calculates:

$$\Delta D_B = D_{2B} - D_{1B} = c(\Delta t_A - \Delta t_B) + (D_{2A} - D_{1A}) \quad \text{(Eq. 6)}$$

Figure 5:
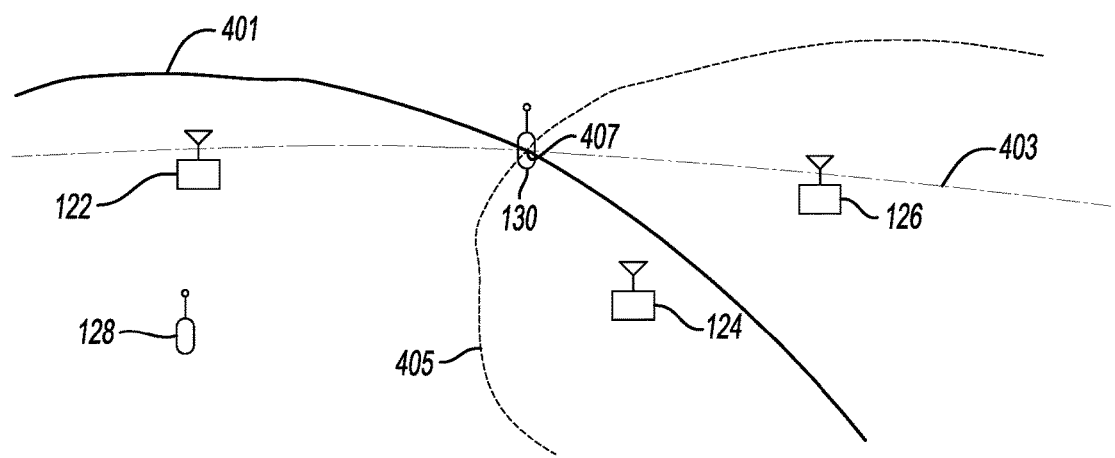
FIG. 5 generally depicts a location of the receiver in relation to a plurality of hyperbolas in accordance to one embodiment.

FIG. 5 generally depicts that the location of the receiver 130 may be a point on a singular hyperbola having a foci at the transmitter 124 and at the transmitter 126 with an eccentricity of:

$$e = \frac{D_{Tra}}{\Delta D_B} \quad \text{(Eq. 7)}$$

Where $D_{Tra}$ is the distance between the transmitters 124 and 126 (the foci) as the location of these transmitters 124 and 126 and the receiver 128 are known.

Generally, FIG. 5 depicts identifying three hyperbolas that intersect a single point. Each hyperbola is associated with location information associated with pairs of transmitters (e.g., transmitters 122, 124; transmitters 122, 126; and transmitters 124 and 126) and the receiver 128. The hyperbolas and pairs of transmitters will be discussed in more detail below.

Figure 6:
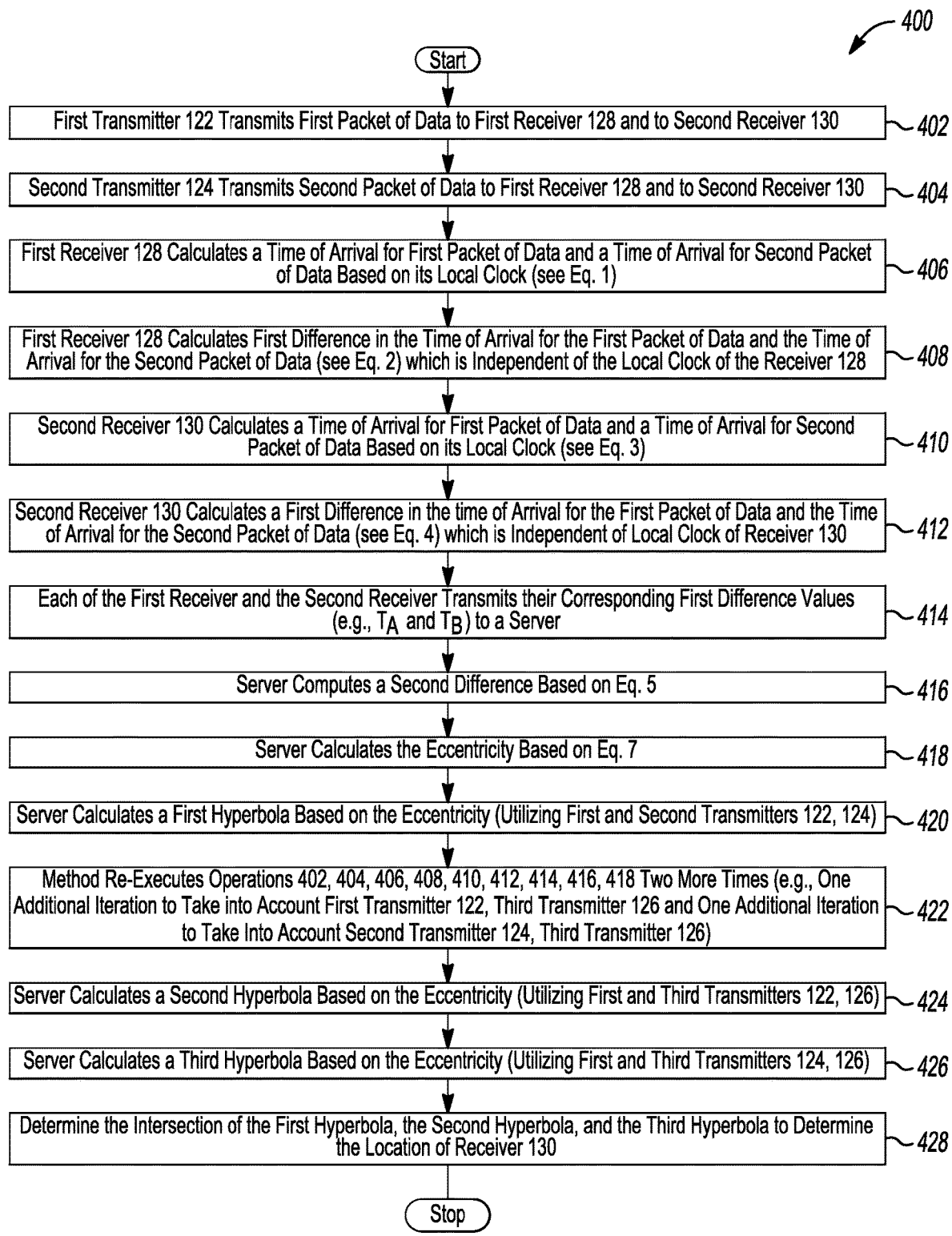
FIG. 6 depicts a method for determining a location of the receiver in accordance to one embodiment.

FIG. 6 depicts a method 400 for determining a location of the receiver 130 in accordance to one embodiment of the present invention. The method 400 generally employs the techniques as set forth in FIGS. 3-5 as noted above. For the method 400, the location of the transmitters 122, 124, 126 and the receiver 128 is known to the server 140. The method 400 utilizes the location of the transmitters 122, 124, 126 and the receiver 128 to determine the location of the receiver 130.

For operations 402, 404, 406, 408, 410, 412, 414, 416, and 418, the method 400 utilizes location information for the two transmitters 122, 124 and the receiver 128 to determine a first hyperbola. The foregoing noted operations 402, 404, 406, 408, 410, 412, 414, 416 are re-executed two more times to take into account location information for the following transmitter pairs: 122, 126 and 124, 126 with the same receiver 128.

In operation 402, the first transmitter 122 transmits a first packet of data (e.g., a WiFi based signal) to the first receiver 128 and to the second receiver 130.

In operation 404, the second transmitter 124 transmits a second packet of data (e.g., a WiFi based signal) to the first receiver 128 and to the second receiver 130.

In operation 406, the first receiver 128 calculates a time of arrival for the first packet of data and a time of arrival for the second packet of data based on its local clock (see Eq. 1 above).

In operation 408, the first receiver 128 calculates the first difference in the time of arrival for the first packet of data and the time of arrival for the second packet of data (see Eq. 2) which is independent of the local clock of the receiver 128.

In operation 410, the second receiver 130 calculates a time of arrival for the first packet of data and a time of arrival for the second packet of data based on its local clock (see Eq. 3 above).

In operation 412, the second receiver 130 calculates the first difference in the time of arrival for the first packet of data and the time of arrival for the second packet of data (see Eq. 4) which is independent of the local clock of the receiver 130.

In operation 414, each of the first receiver 128 and the second receiver 130 transmits their corresponding first difference values to the server 140. It is recognized that the first receiver 128 may alternatively transmit its corresponding first difference value to the second receiver 130.

In operation 416, the server 140 (or the second receiver 130) computes a second difference based on Eq. 5.

In operation 418, the server 140 (or the second receiver 130) calculates the eccentricity based on Eq. 7.

In operation 420, the server 140 (or the second receiver 130) calculates a first hyperbola 401 (see FIG. 5) based on the eccentricity as determined in operation 418 and on the location of the transmitters 122, 124, the loci of the hyperbola. In general, to determine the first hyperbola, the eccentricity need be known in addition to the location (loci) of the transmitters 122 and 124. As noted above, the location of the transmitters 122 and 124 are known. Therefore, it is possible to determine the loci and the distance between the transmitters 122 and 124 and calculate e.

In operation 422, the method 400 re-executes operations 402, 404, 406, 408, 410, 412, 414, 416, and 418 two more times. As noted above, the first time that method 400 was executed, information corresponding to the location of the transmitters 122, 124 was utilized. However, it is necessary to investigate all of the transmitter pairs to determine the location of the receiver 130. Thus, the second time operations 402, 404, 406, 408, 410, 412, 414, 416, and 418 are executed, information corresponding to the location of the transmitters 122 and 126 are employed. Further the third time operations 402, 404, 406, 408, 410, 412, 414, 416, and 418 are executed, information corresponds to the location of transmitters 124 and 126 are employed.

In operation 424, the server 140 (or the second receiver 130) calculates a second hyperbola 403 (see FIG. 5) based on the eccentricity as determined in operation 418 and on the distance between the transmitters 122 and 126.

In operation 426, the server 140 (or the second receiver 130) calculates a third hyperbola 405 (see FIG. 5) based on the eccentricity as determined in operation 418 and on the distance between the transmitters 124 and 126.

In operation 428, the server 140 (or the second receiver 130) determines (or locates) a location 407 which corresponds to a point (or intersection) in which the first hyperbola 401, the second hyperbola 403, and the third hyperbola 405 intersect. The server 140 identifies the location 407 as the location of the second receiver 130.

The foregoing solution may be part of the Hyperbolic Navigation Time Difference of Arrival (TDOA) family that has the ability to withstand or survive inaccurate WiFi clocks as noted above. Each measurement may provide a corresponding curve or a hyperbola as detailed above. Three such measurements provide a unique solution. Other techniques such as interferometry which may define straight lines that originate at the same transmitter locations (loci), as referenced above, as the loci can be used to intersect with the above hyperbolas and interferometry lines and provide a robust location estimation for an unknown receiver (and an unknown transmitter as discussed below in a dual constellation).

Determining the Location of a Transmitter

Figure 7:
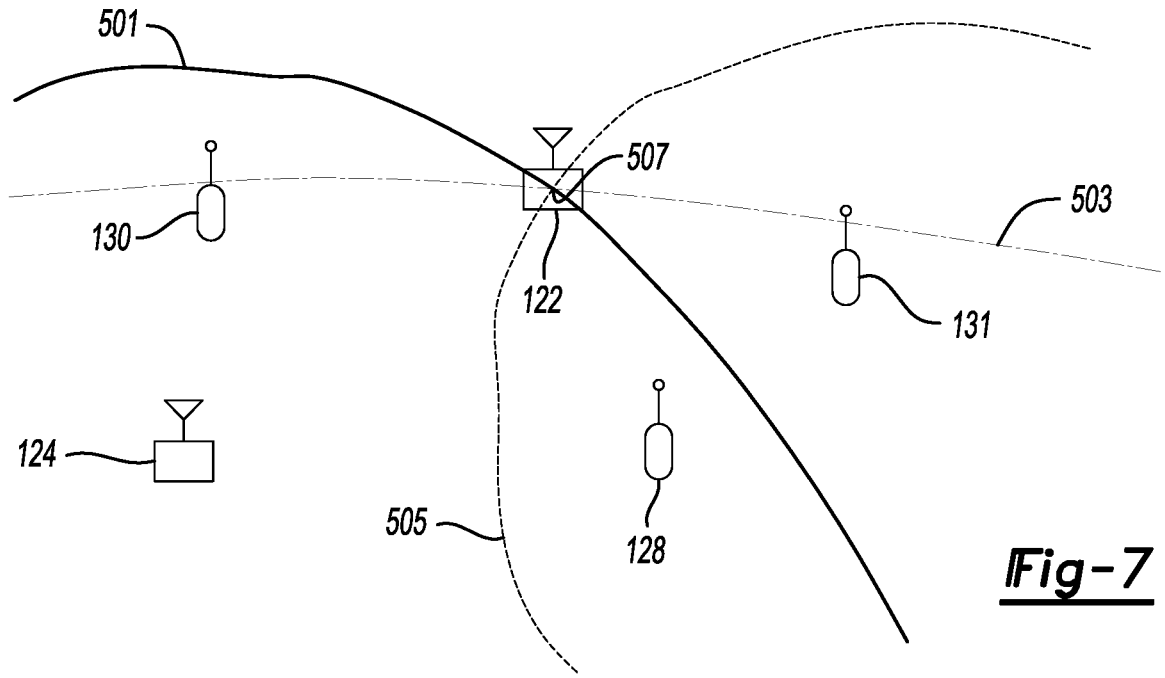
FIG. 7 depicts a second system for determining the location of any one of the transmitters relative to the mobile devices in accordance to one embodiment.

FIG. 7 generally depicts a second system 450 for determining the location of any one of the transmitters 122 or 124 relative to the receivers 128, 130, and 131 in accordance to one embodiment. For purposes of illustration, the location of the transmitter 124 and the receivers 128, 130, 131 are known. Thus, it is desirable to determine the location of the transmitter 122.

The similar analysis as applied in connection with the first system 300 as detailed in connection FIGS. 5 and 6 may be applied to FIG. 7. However, instead of determining the location of the second receiver 130 based on the known location of the first receiver 128 and the transmitters 122, 124, and 126 as set forth in the first system 300, the second system 450 determines the location of the first transmitter 122 based on the known locations of the second transmitter 122, the first receiver 128, the second receiver 130, and the third receiver 131. FIG. 7 illustrates a spatial arrangement of the first transmitter 122, the first receiver 128, the second receiver 130, and the third receiver 131 with respect to the second transmitter 124. It is recognized that the disclosure and various equations as set forth in connection with FIGS. 5 and 6 also apply to the manner in which the location of the first transmitter 122 is determined with various receivers 128, 130 of FIG. 5 being replaced with the transmitters 122, 124 of FIG. 7 and the transmitters 122, 124, 126 of FIG. 5 being replaced with the receivers 128, 130, 131 of FIG. 7.

FIG. 7 illustrates a similar spatial relationship to that illustrated in FIG. 5 with the exception being the placement of the second transmitter 124, the first receiver 128, the second receiver 130, and the third receiver 131 with respect to the first transmitter 122. For example, FIG. 7 depicts that the second receiver 130 replaces the position of the first transmitter 122 as shown in FIG. 5, that the second transmitter 124 replaces the position of the first receiver 128 as illustrated in FIG. 5, that the first receiver 128 as illustrated in FIG. 7 replaces the position of the second transmitter 124 as illustrated in FIG. 5, that the third receiver 131 of FIG. 7 replaces the position of the third transmitter 126 of FIG. 5. FIG. 7 has been illustrated in the manner noted above for purposes of brevity and will not restate the corresponding disclosure and equations also for purposes of brevity.

Thus, in the case as noted above where the location of the first receiver 128, the second receiver 130, and the second transmitter 124 are known, hence the following may be provided:

$D_{2A}-D_{2B}$ and $D_{Rec}=D_{AB}$ are known (see FIG. 3), the first receiver 128 reports $\Delta t_A$ to the second receiver 130, and the second receiver 130 measures $\Delta t_B$ and calculates:

$$\Delta D_1 = D_{1A} - D_{1B} = c(\Delta t_A - \Delta t_B) + (D_{2A} - D_{2B}) \quad \text{(Eq. 8)}$$

The location of the first transmitter 122 is a point on a singular hyperbola the foci of which are $Rec_A$ and $Rec_B$ with eccentricity of $$e = \frac{D_{Rec}}{\Delta D_1} \quad \text{Eq. 9}$$

The server 140 may perform the calculation of determining the eccentricity. Further, as similarly noted above, the server 140 may calculate the hyperbola for each pair of receivers (e.g., receivers 128, 130; receivers 128, 131; receivers 130, 131)). The server 140 calculates a first hyperbola 501 (see FIG. 7) based on the eccentricity as determined in Eq. 9 and on the distance between the receivers 128, 130. In general, to determine the first hyperbola, the eccentricity need be determined, in addition to the knowledge of the location of the receivers 128, 130, the loci of the hyperbola. As noted above, the location of the receivers 128 and 130 are known.

The server 140 calculates a second hyperbola 503 (see FIG. 7) based on the eccentricity as determined from Eq. 9 and on the location of the receivers 128 and 131. The server 140 calculates a third hyperbola 505 (see FIG. 7) based on the eccentricity as determined from Eq. 9 and on the distance between the receivers 130 and 131. The server 140 (or the second receiver 130) calculates a third hyperbola 405 (see FIG. 5) based on the eccentricity as determined from Eq. 9 and on the distance between the receivers 130 and 131.

The server 140 (or the second receiver 130) determines (or locates) a location 507 which corresponds to a point in which the first hyperbola 501, the second hyperbola 503, and the third hyperbola 505 intersect. The server 140 identifies the location 507 as the location of the first transmitter 122.

Report Protocol

In order to perform the proposed implementations as set forth in FIGS. 3-7 which incorporate utilizing time measurements as reported by receivers 128, 130, 131 to the server 140 or to one or more of the transmitters 122, 124, 126. For the implementations as set forth in FIGS. 3-7, there may be, for example, a total of five transmitters plus receivers. Each transmission report generated by the receiver 128, 130, 131 generally includes:

1) A unique ID of the receiver 128, 130, 131 (e.g., a 48-bit media access content (MAC) address
2) A sufficiently unique transmission ID α and a transmitter ID for a first transmitter 122, 124, 126 that transmit data to the receivers 128, 130, 131
3) A sufficiently unique transmission ID β and a transmitter ID for second transmitters 122, 124, 126 that transmit data to the receivers 128, 130, 131.
4) A local receive timestamp at high resolution, using agreed upon time units (e.g. 100 pico ($10^{-10}$) seconds), with long unsigned integers. Time zero is arbitrary and may change at predetermined instances (e.g., when batteries are replaced at the receiver 128, 130, 131).

The server 140 may extract the transmitter ID from the transmission message (e.g., transmitter address (TA) in WiFi packets of type, Beacon, Data, RTS etc.) as provided by the receiver 128, 130, 131.

The transmission ID may be implicit such as for example, a hash of the first N bytes of data, an FCS (Frame Check Sequence) suffix as sent by the transmitter 122, 124, 126) in accordance with IEEE802.11, for example, a receive timestamp or a combination of the above. In some cases, the transmission ID may be explicit such as for example, the transmitted 64 bit timestamp ("TSF") in WiFi Beacons.

The above reports may be used to facilitate matching transmission pairs α, β sent by the transmitters, as measured by the multiple receivers (e.g., there may be three transmitters in addition to the receivers).

For example, the receiver 128 may report the following to the server 140:
RxID=0x00607c07049A:
$TxID_1$=0x0014de098743     $TxID_2$=0x0056e1098743
α=0x6f4e3a5e β=0xee437611 Δt=78.0769286.

The RxID in the report provides information corresponding to the reception of two packets with origins $TxID_1$ $TxID_2$ packets identified by α and β where the signals are received at Δt milliseconds apart as measured by the local clock of the receiver 128, 130, 131. Packet pairs with $TxID_1=TxID_2$. from the same originator (or transmitter 122, 124, or 126) may be used to measure clock drifts as noted below.

Based on the reports accumulated at the server 140 in terms time differences between particular transmissions α and β taken by receivers 128, 130, 131, the server 140 may be able to provide a hyperbola that can be drawn on the plane. This procedure may be repeated three times such that a total of three hyperbolas are provided. The intersection of the hyperbole is the location of the unknown receiver in this case (or the receiver 130 as noted above).

Calibration to Account for Time Drift Between Receivers

Prior to determining the location of the receiver or the transmitter, it is recognized that a calibration occurs to account for a time drift between the receivers 128, 130, and 131. In reference to the receivers 128, and 130, the time differences measured by the receivers 128, 130 (e.g., $\Delta t_A$, $\Delta t_B$) are clocked locally. However, the time differences may be affected by a local drift between a corresponding local clock for the receiver 128 and for the receiver 130. For example, the clocks for the receiver 128 and the receiver 130 are not synchronized with one another and a time drift may occur between such receivers 128 and 130. In one example, the time drift may correspond to one second every hour, e.g., after one hour of the clock for the receiver 128, and the clock for the receiver 128 will be ahead of the clock for the receiver 130, by one second. The local clock drift between the receivers 128, 130 may be compensated for by using two packet transmissions α, β from a single transmitter 122 for example. Alternatively, transmitters 124 or 126 may also be used for this purpose. The two packet transmissions α, β are received by both the receivers 128 and 130. Each of the receivers 128, 130 compute the time difference between packet arrivals, which is location invariant, since both packets travel the same distance to a particular receiver 128 or 130. The receivers 128, 130 report the time distance between packet arrivals to the server 140.

The server 140 calculates the ratio $$r = \frac{T_{A\alpha} - T_{A\beta}}{T_{B\alpha} - T_{B\beta}} \quad \text{(eq. 10)}$$

that is used by the receiver 128 to compensate for time differences measured by the receiver 130. The server 140 calculates $r^{-1}$ that is used by the receiver 130 to compensate for time differences measured by the receiver 128. The server 140 provides compensated readings back to the receiver 128 and the receiver 130.

Consider the following example, if transmissions (or signals) α, β are transmitted at $\Delta t$=103.461963 msec apart from one another by transmitter 122. The time difference between these events is location independent since both travel the same path, for example, from the location of the transmitter 122 to the location of the receiver 128 and from the location of the transmitter 122 to the location of the receiver 130. Hence, ideally both receivers 128 and 130 estimate the same time difference Δt. Since both local clocks for each receiver 128, 130, respectively, have discrepancies, for example, the receivers 128, 130 may determine a $\Delta t_A^0$=103.461531 and a $\Delta t_B^0$=103.461229, respectively (i.e., $\Delta t_A^0$ corresponds to the time difference between α, β for the receiver 128 and $\Delta t_B^0$ corresponds to the time difference between α, β for the receiver 130). Therefore, when the receiver 128 receives a time report from the receiver 130 (via the server 140), the receiver 128 may correct future readings of future transmissions (from the receiver 130 as received from the server 140) of $\Delta t_B^1$ to its local time base based on the following:

$$\Delta t_B^{1A} = \Delta t_B^1 * \frac{103.461531}{103.461229}. \quad \text{(see Eq. 10)}$$

Additionally, when the receiver 130 receives a time report from the receiver 128 (via the server 140), the receiver 130 may correct for future readings of further transmissions (from the receiver 128 as received from the server 140) based on the following;

$$\Delta t_A^{1B} = \Delta t_A^1 * \frac{103.461229}{103.461531}. \quad \text{(see Eq. 11)}$$

Time of Arrival Estimation

The receivers 128, 130 may determine the time of arrival by auto-correlating a received Long Training Field (LTF) symbol (e.g., in connection with a WiFi based signal) as received from the signals (e.g., first and second packets PCK1 and PCK 2) transmitted from the transmitters 122, 124, 126. The LTF provides low side lobes and a steep main lobe in the auto-correlation function. However, adjacent symbols of the a particular LTF symbol of interest are non-zero signals which thereby affect the resultant correlation function. For example, LTFs may be transmitted with 2.5 repetitions (e.g., one half of an LTF is sent, then an LTF is sent, and then the LTF is sent again). The resultant auto-correlation comprises multiple peaks.

The free space decorrelation time of the WiFi signal may be 50 ns at a 20 MHz bandwidth. With the WiFi standard, orthogonal frequency division multiplexing (OFDM) based beacons (or packets) may be transmitted at the 20 MHz bandwidth. Typical digital receivers may process the incoming signal at 20 Ms/s (complex) for 20 MHz the channel bandwidth with a decorrelation time of 50 ns corresponding to roughly 15 m, the speed of light. In general, 52 out of the 64 frequency bins may be populated, hence the location resolution may increase to 18.5 meters.

As generally shown in FIG. 1, each transmitter 124, 126 may use a plurality of antennas 135 to transmit the packets (e.g., WiFi, beacons) and each of the transmitters 122, 124, 126 transmit the packets coherently, from the plurality of antennas as opposed to transmitting the packets from a single antenna. Space coding may be applied to overcome black spots (e.g., locations whereby destructive interference annihilates the signal). In various OFDM cases, a Cyclic Delay Diversity (CDD) may be used to transmit different versions of the same signal from the plurality of antennas 135. CDD generally applies to multiple antenna transmission schemes. A superimposed signal as received at each of the receivers 128, 130 (e.g., as received from the transmitters 122, 124, 126) may affect time estimations in different ways. For example, the auto-correlation function of the LTF comprises peaks of equal height, one per antenna element 142. The time difference between peaks amounts to a delay applied in the CDD (e.g., four 50 nsec samples) in the case of two antennas 135 that transmit WiFi based signals (e.g., beacons or packets). It is also recognized that the transmitters 122, 124, 126 may also transmit the packets (e.g., WiFi beacons) via a single antenna 135. If any of the transmitters 122, 124, 126 transmit a packet of data via a single antenna 135, then a CDD may not be applied.

Coarse Time of Arrival Estimation

Figure 8:
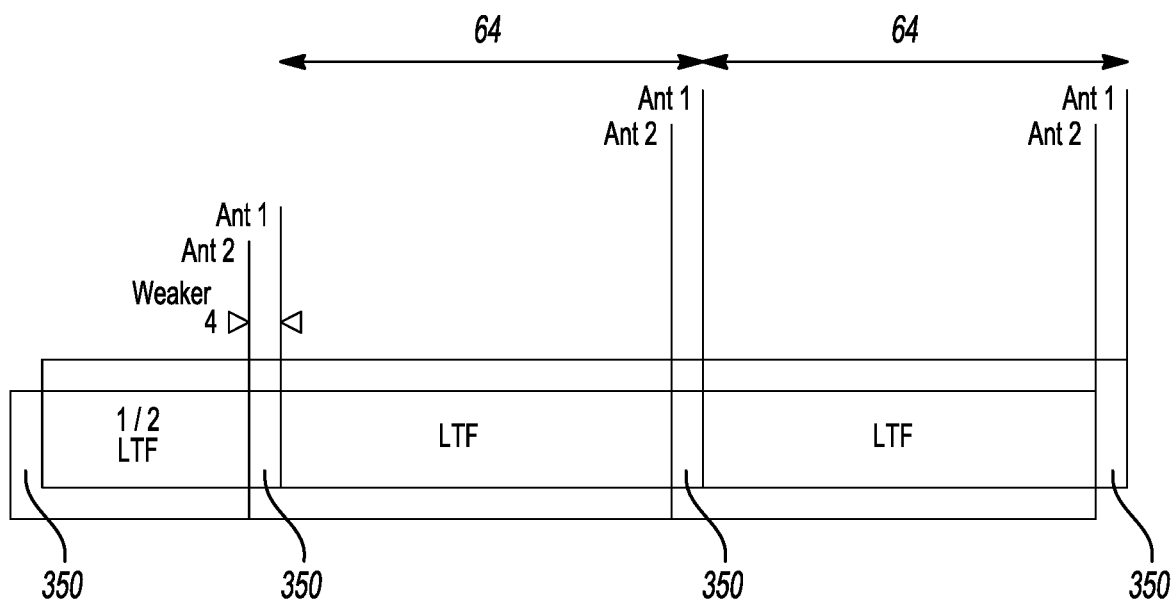
FIG. 8 illustrates a two-antenna implementation on a given transmitter with the cyclic delay diversity.

To determine the time of arrival of various signals received from the transmitters 124, 126, the receivers 128, 130 generally undergo differing detection phases to ascertain a final arrival time of the signals (or packets). In a first phase, each of the receivers 128, 130 perform a coarse time of arrival estimation by analyzing discrete peaks of the auto-correlation with the LTF symbol. For example, specific peaks of the autocorrelation are generally spaced apart at predetermined time intervals from one another, where additionally the amplitude of the peaks at such predetermined time intervals generally corresponds to the envelope of the known autocorrelation of LTF with itself. There may be three factors that create ambiguity in the form of multiple peaks in time:

(a) the linear auto-correlation of a standardized LTF may not be ideal. The ideal function may be Kronecker Delta. In general, low side lobes may be generated by even a single LTF, padded with hypothetical zeroes before and after;

(b) the LTF in the signal transmitted from the transmitters 122, 124, 126 is sent in repetition (e.g., pursuant to WiFi protocol (or IEEE802.11 for example)), thereby generating two peaks of the same strongest correlation and a few peaks of weaker correlation, 64 samples apart as set forth, for example, in the IEEE802.11 case; and (c) the encoded signals that are transmitted from the transmitters 122, 124, 126 may create an artificial negative delay which provides a resulting peak replication at a negative offset of, for example, 200 nsec (4*50 nsec samples) as illustrated in FIG. 8 (see elements 350) in the case of two antenna legacy mode for each transmitter 122, 124, 126. CDD is generally specific to multiple antenna transmission.

Figure 9:
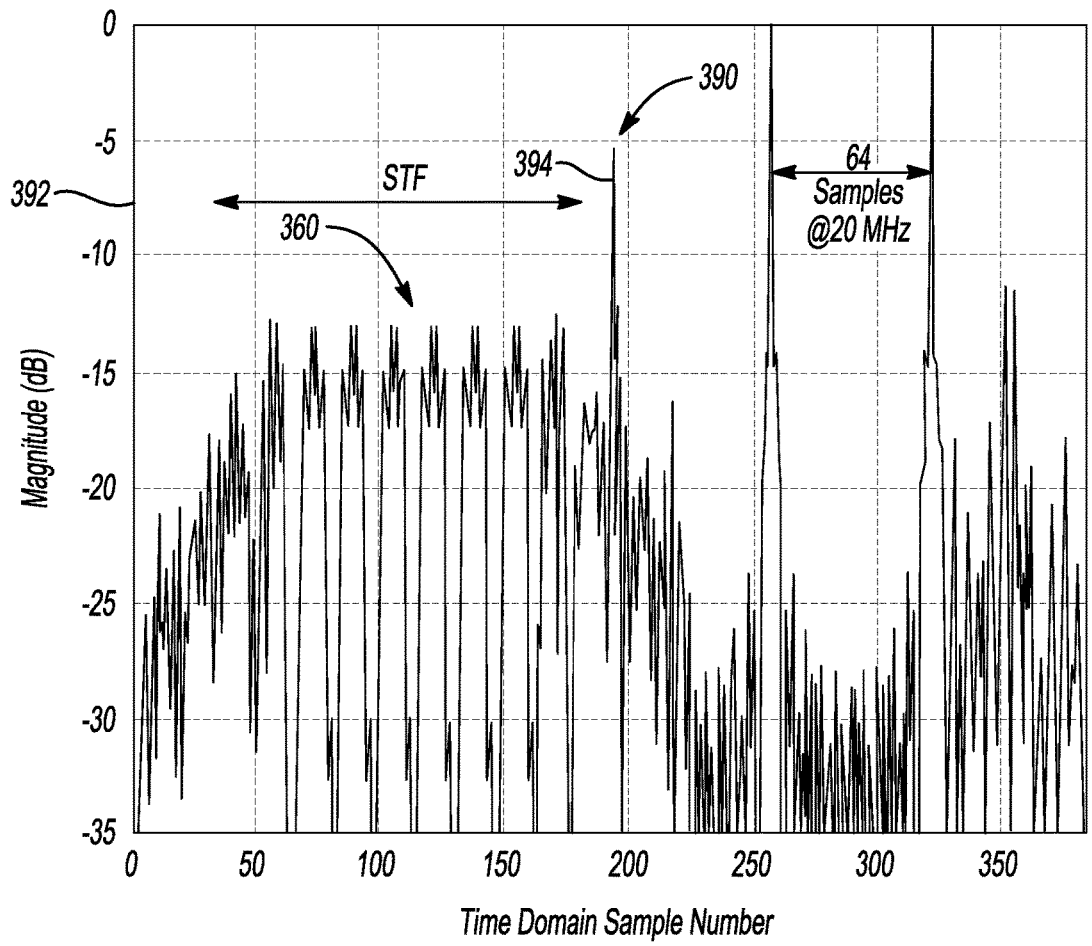
FIG. 9 illustrates a single antenna implementation on a given transmitter.

In general, each receiver 128, 130 is configured to extract the N-strongest (e.g., N=4) auto-correlation peaks within a predetermined time interval for a predetermined duration. This may start at a detected time of a Short Training Field (STF) pattern 360 in the WiFi based signal that is transmitted from the transmitters 122, 124, 126. FIG. 9 generally depicts at least one aspect related to performing the first phase detection (e.g., coarse detection) in accordance to one embodiment. FIG. 9 depicts the STF pattern for the transmitted signal from a single antenna of the transmitter 122, 124. FIG. 6 generally illustrates the two transmitted signals from two antennas 135 for a corresponding transmitter 122 or 124 and the corresponding CDD that is applied to separate the signals (e.g., again, see elements 350).

The desired peak pattern in a legacy LTF WiFi based signal utilizing the two antenna 135 configuration for each of the transmitters 122, 124, 126, includes each LTF symbol on the incoming signal from the transmitters 122, 124, 126 to include the strongest peaks that are separated by one another by the predetermined amount of time of, for example, T+0, T+4, T+64, or T+68 for arbitrary T. Referring back to FIG. 8, the predetermined peaks (or predetermined time intervals) of T+4 and T+68 may be specific to a multiple antennae transmission scheme (e.g., the utilization of two antennas 135 for a single transmitter 122, 124). The receivers 128, 130 as generally set forth herein may extract T under some arbitrary assumption about the added channel effects (or additional antenna affects since two antennas 135 for a particular transmitter 122, 124, 126 are utilized). For example, additive noise turn stronger than real peaks (e.g., there is no threshold and the peaks are sorted and the N strongest peaks (e.g., N=4) are selected) thereby creating a somewhat different pattern than the noise free pattern, as shown at 394 in FIG. 9. In one example, the two strongest peaks may be separated by a predetermined time interval of any one or more of the following: T+0, T+4, T+50, and/or T+68 (e.g., 64 is not strong enough and 50 is unrelated to the signal, mere additive noise). In another example, the two four strongest peaks may be separated by another predetermined time interval of any one or more of the following: T+4, T+30, T+64, and T+68 (e.g., T+0 is not strong enough and T+30 is mere additive noise). Each of FIGS. 8 and 9 generally illustrate that the two strongest peaks are separated by one another at a predetermined time interval of T+64 (or 64 samples) when only one transmitting antenna is used and no noise is present. Thus, the receiver 128, 130 selects these strongest peaks as peaks of interest for further examination based on the predetermined time interval between such peaks. In the two transmitting antennas case, the receivers 128, 130 may assume, for example, that one of the strongest four received peaks may be noise and another one of the four transmitted peaks is absent (not among the four strongest peaks). Reference is made to four transmitted peaks since each transmitter 122, 124, 126 transmits the signal via two antennas 135 per transmitter 122, 124, 126. FIG. 8 generally illustrates the two antennas 135 implementation on a given transmitter 122, 124, 126 with the CDD and FIG. 9 generally illustrates a single antenna 135 implementation on a given transmitter 122, 124, 126. The implementation in FIG. 9 is provided merely for illustrative purposes. The above provides a coarse estimation of the above epoch (time of arrival) "T".

Precise Time of Arrival Estimation (Discrete)

To determine the time of arrival of various signals received from the transmitters 122, 124, 126, the receivers 128, 130 generally undergo differing detection phases to ascertain a final (or precise or accurate) arrival time of the signals (or packets). As noted above, each of the receivers 128, 130 may perform a coarse time detection scheme. Each of the receivers 128, 130 may also perform a precise time detection scheme of the incoming signal after the coarse time detection scheme is performed. With the precise time detection scheme of arrival, the overall resolution increase may occur by up to, for example, two orders of magnitude, and may be achieved by interpolation. The interpolation may use convolution with samples of sinc( ) (e.g., or alternatively by zero padding the FFT of the samples) that is followed by peak selection of the complex envelope. For example, the interpolation of 32x may result in a resolution of about 58 cm. These methods may be discrete in nature, for example, padding to a quadruple the length of the data may improves the resolution by up to four times. Complexity may grow by the following (n=4 in the example):

$$\frac{1}{2} n \log(n) \qquad \text{(Eq. 12)}$$

So long as a channel delay spread is smaller than 4*50=200 nseconds (about 67 meters), the two CDD peaks will not overlap. A single transmitter detector implementation (e.g., one of the receivers 128 or 130) correlates with $s^*_{LTF}(t)$, * denotes complex conjugate. The two-transmitter detector (e.g., the receiver 128 or 130) may correlate with $$s^*_{LTF}(t)+s^*_{LTF}(t+T_{CDD})$$ (Eq. 13)

where * denotes a complex conjugate. Alternatively, a correlator for a single transmitter element (e.g., the transmitter 122, 124, or 126) may be applied, followed by a time window of $$(-100, 50)\left(-\infty, \frac{T_{CDD}}{2} - T_{GI}\right)$$

another time window of $$\left(\frac{T_{CDD}}{2} + T_{GI}, \infty\right)$$

where the guard interval may be set for example to $$\frac{T_{CDD}}{8},$$

and then averaging over the estimations, where $T_{CDD}$ is the known delay introduced between the antennas 135. For example, in a two-antenna based legacy mode, the delay is 4*50 nsec=200 nsec and $T_{GI}$ is a time quantity that is defined to guard against spillover between one antenna 135 to another antenna 135 as used in the selection of a window size as noted above.

In general, if the coarse peak was found at sample 215, the interval [212, 213, . . . , 219] comprising eight samples may be interpolated by 32 into 8*32=256 points in time, spaced $$\frac{50 \text{ nsec}}{32} = 1.5625 \text{ nsec.}$$

The peak of the envelope may be the refined time of arrival estimate. For example, the peak is at the $143^{rd}$ sample out of 256. This translates into the arrival time of $$\left(215 + \frac{143 - 128}{32}\right) \times 50 = 10{,}773.4375 \text{ ns.}$$

The above formula originates from the following. For example, time is divided into 256 intervals of 1/32 sample each, 8 samples in total from 212 to 219 inclusive. The high-resolution estimate provides the number of 1/32 samples from start of the interval, between 0 and 255 inclusive. In the above example with respect to the $143^{rd}$ sample, the time estimate in nanoseconds is the coarse estimate (e.g., 215) plus the fraction 15/32 (see above $$\frac{143 - 128}{32}\Big)$$

translated from number of samples*50 nsec. By comparison, the coarse estimation in this example yields 215×50=10, 750.0000 ns. In the example, the difference between the coarse and fine estimates translates into a displacement of 13.59 meters (58 cm per nanosecond as explained above).

Figure 10:
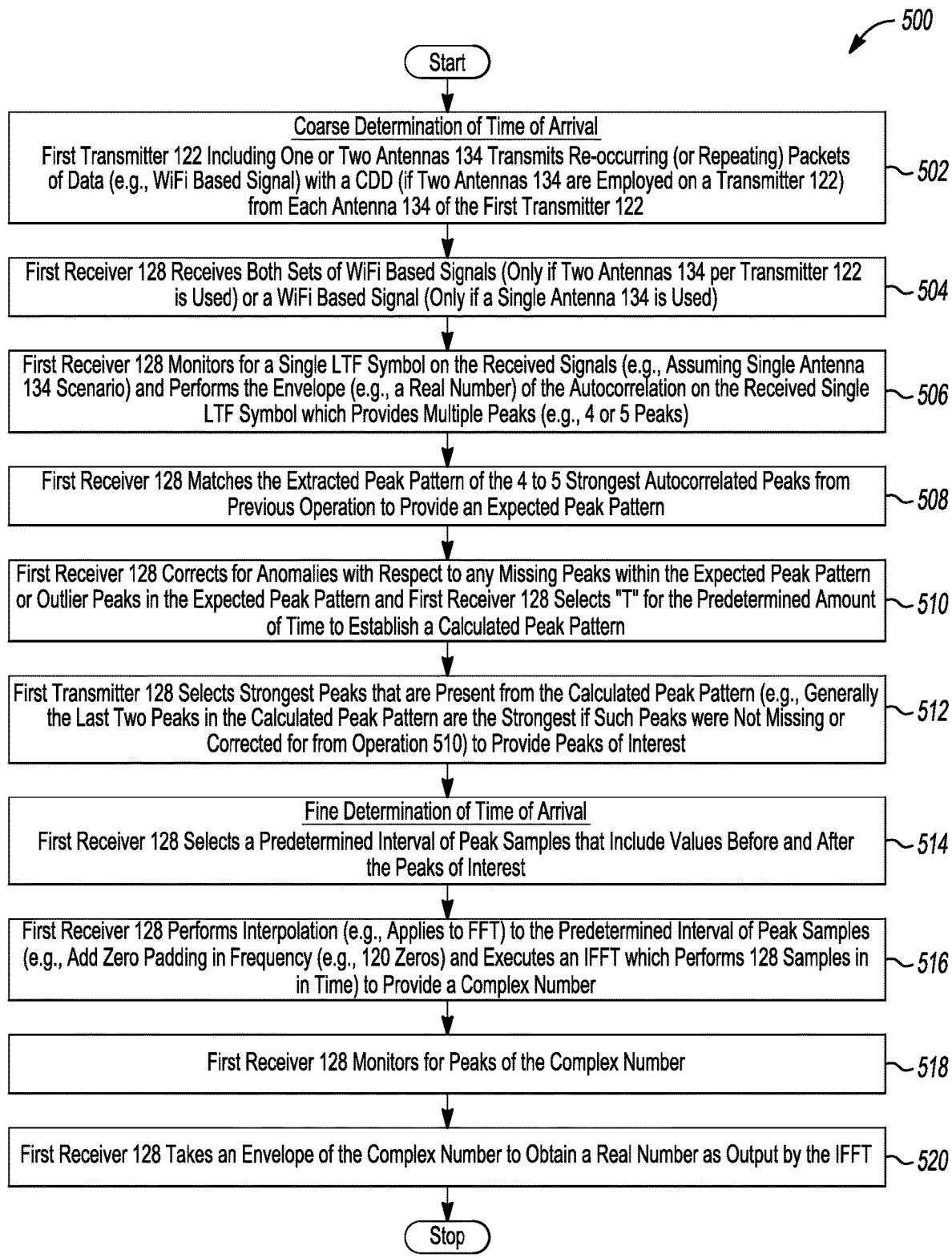
FIG. 10 depicts at least one aspect related to performing a coarse detection and a fine detection in accordance to one embodiment.

FIG. 10 depicts a method 500 for performing a coarse determination of the time of arrival (e.g., see operations 502-514) and a fine determination of the time of arrival (e.g., see operations 514-520) in accordance to one embodiment of the present invention.

In operation 502, the first transmitter 122 including one or two antennas 135 transmits re-occurring (or repeating) packets of data (e.g., WiFi based signal) with a CDD (if two antennas 135 are employed on a transmitter 122) from each antenna 135 of the first transmitter 122.

In operation 504, the first receiver 128 receives both sets of WiFi based signals (e.g., this is the case if two antennas 135 per transmitter 122 are used). If a single antenna 135 is incorporated on the first transmitter 122, then only a single WiFi based signal is received.

In operation 506, the first receiver 128 monitors for a single LTF symbol on the received signals (e.g., again assuming a single antenna 135 implementation) and performs the envelope (e.g., a real number) of the autocorrelation on the received single LTF symbol which provides multiple peaks (e.g., 4 or 5 peaks). In other words, the first receiver 128 determines the envelope autocorrelation which corresponds to the four strongest peaks of the LTF symbol.

In operation 508, the first receiver 128 matches the extracted peak pattern of the four strongest autocorrelation envelope peaks from previous operation to provide an expected peak pattern or both. Each of the peaks of the expected peak pattern, in absence of noise, may be separated by a predetermined amount of time (e.g., T+0, T+4, T+64, or T+68) for two transmitting antennas 135 of the first transmitter 122. Out of the four strongest autocorrelation peaks, it is possible that one such peak may be erroneous (unrelated to the transmitted signal) and the other may be missing altogether (e.g., excluded from the list of four strongest peaks).

In operation 510, the first receiver 128 corrects for anomalies with respect to any missing peaks within the expected peak pattern or outlier peaks in the expected peak pattern (or both). The first receiver 128 determines the time "T" for the predetermined time interval to establish a calculated peak pattern. Assuming for example, that the first receiver 128 determines that T corresponds to 70, then the calculated peak pattern is (70, 74, 134, 138). This generally corresponds to an noise free peak pattern. However, as noted above, the more likely measured peak pattern may include, for example, an erroneous value (e.g., one peak may be erroneous) and a missing value (e.g., one peak may be missing from the detected LTF symbol). For example, the expected peak pattern may be (70, 90 (an erroneous value), 134, 138). The first receiver 128 may fill in for the missing peak and discard the erroneous peak from the received peak pattern and provide (70, 74, 134, 138) as the reinforced peak pattern (or calculated peak pattern). The first receiver 128 may select the peak T+64=134 as the course peak. Again, the peak 134 is not an erroneous or missing peak, therefore such a peak is suitable for further examination and to perform additional analysis. On the other hand in the above example, T+4=74 was missing (i.e., a phantom) and cannot be used further for locating.

In operation 512, the first receiver 128 selects one or more strongest peaks that are present in the calculated peak pattern to provide one or more peaks of interest. Assuming the expected peak pattern is (70, 74, 134, 138) as noted in operation 510, the first receiver 128 selects the peaks of 134 as the peaks of interest as a result of performing the coarse determination. It bears mentioning that the first receiver 128 only selects the one or more peaks that are initially present as identified in the expected peak pattern. Because peak 134 was present, this peak will be selected. Further, the first receiver 128 is generally interested in the strongest peaks. In general, the peak pattern of 70, 74, 134, 138 may be of equal strength and those received prior to these may be considered weak (e.g., see FIG. 9 and peaks to the left of 394). The peak pattern 70, 74, 134, 138 may be considered to have noise free equal strength as a result of the one half of the LTF, as the LTF is repeated two and one half times. The pattern recognized as described above selects the N strongest peaks, ignoring the fact that weaker peaks arrive sooner. One or more of the strongest peaks generally occur later in time. If both of the strongest peaks are present as illustrated in the example provided, then the first receiver 128 may take the average timing estimates of such values. Again, the first receiver 128 will not take a peak that is determined to be erroneous or missing as this will lead to an outlying estimation.

The fine estimation of arrival starts in operation 514. In operation 514, the first receiver 128 selects a predetermined interval of peak samples that include values before and after the peak of interest. For the peak of interest (e.g., 134); the first receiver 128 selects the interval of [131-138] for a total of 64 LTF samples (pre autocorrelation) for fine estimation processing.

In operation 516, the first receiver 128 performs interpolation (e.g., applies a Fast Fourier Transform (FFT) based interpolation) to the predetermined interval of peak samples. In this case, the first receiver 128 performs the FFT, zero pads in frequency (e.g., (16−1)*64=960 zeros) e.g., 16 fold interpolation, and performs an Inverse Fast Fourier Transform (IFFT) which results 16*64=1024 complex samples in time. The resultant LTF interpolation of 1024 samples is correlated with a 16 fold decimated fresh (synthetic) LTF signal, $LTF_{x16}$, 64*16 samples long, to provide a high time resolution of the LTF autocorrelation signal, 50/16=3.125 ns per sample in the example. $LTF_{x16}(16*k)=LTF(k)$, k=0, 1, 2, . . . 63, zero otherwise. In general, the higher the interpolation the better the resolution is with at the added cost of complexity. The resolution may have some physical limitations. In terms of applications, it may be preferable to aim for an interpolation of 32 or even 64 which amounts to 47 cm or 23 cm, respectively. In general, 1 nanosecond amounts to 30 cm.

In operation 520, the first receiver 128 takes the envelope of the complex number as output by the IFFT to obtain real envelop numbers. Such an output provides the two highest peaks (e.g., roughly 134 or 138) since these peaks were the strongest peaks as determined during the coarse determination. In this case, the first receiver 128 is taking the strongest peak out of 128 samples (which is provided by performing the IFFT) and that peak value corresponds to 134.25 (e.g., this is four samples after 134 (e.g., 4/16=0.25). The method 500 provides an accuracy of 1/16 of a sample and this yields an improvement. In general, such an accuracy of 1/16 of a sample amounts to 50/16*0.3 m=0.94 m.

Precise Time of Arrival Estimation (Continuous)

A continuous time estimation may be achieved by estimating the linear component of phase vs frequency of the FFT of the received LTF. This generally serves an alternate embodiment to the discrete precise time of arrival described above without the need to implement the discrete coarse time of arrival. The phase slope, in the case of a single transmitting antenna 135 (or the transmitter 122 or 124 or 126), is proportional to the delay: a 2*pi slope across 64 bins in the FFT amounts to exactly one samples of 50 ns. In the case of two transmitting antennas 135 for each transmitter 122, 124; the signal is more involved but may be extricated: the slope of samples taken every 16 bins may be equally proportional to the delay, thereby eliminating the effect of the CDD. Each of the 16 initial phases (or bins) may contribute to the quality of an estimator of the receivers 128, 130 that perform the precise time estimation in which all may be unbiased with one another (or that 16 estimators on average provide the same result).

Figure 11:
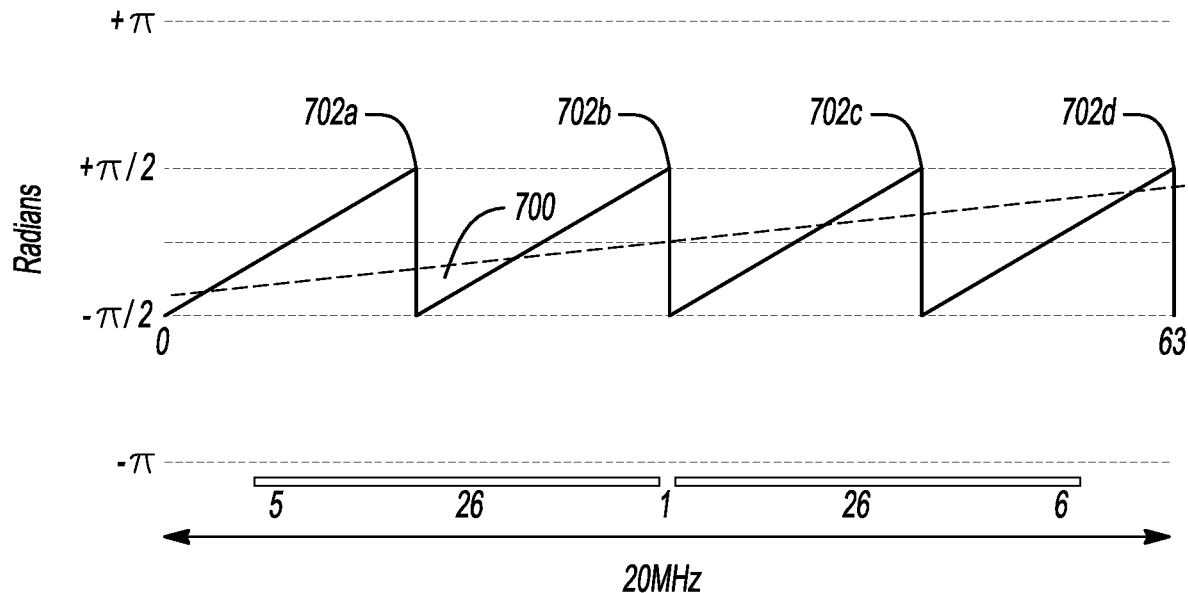
FIGS. 11 and 12 illustrate two arbitrary scenarios for time of flight (TOF) values and Direction of Departure (DoD) angles associated with a precise time detection scheme in accordance to one embodiment.
Figure 12:
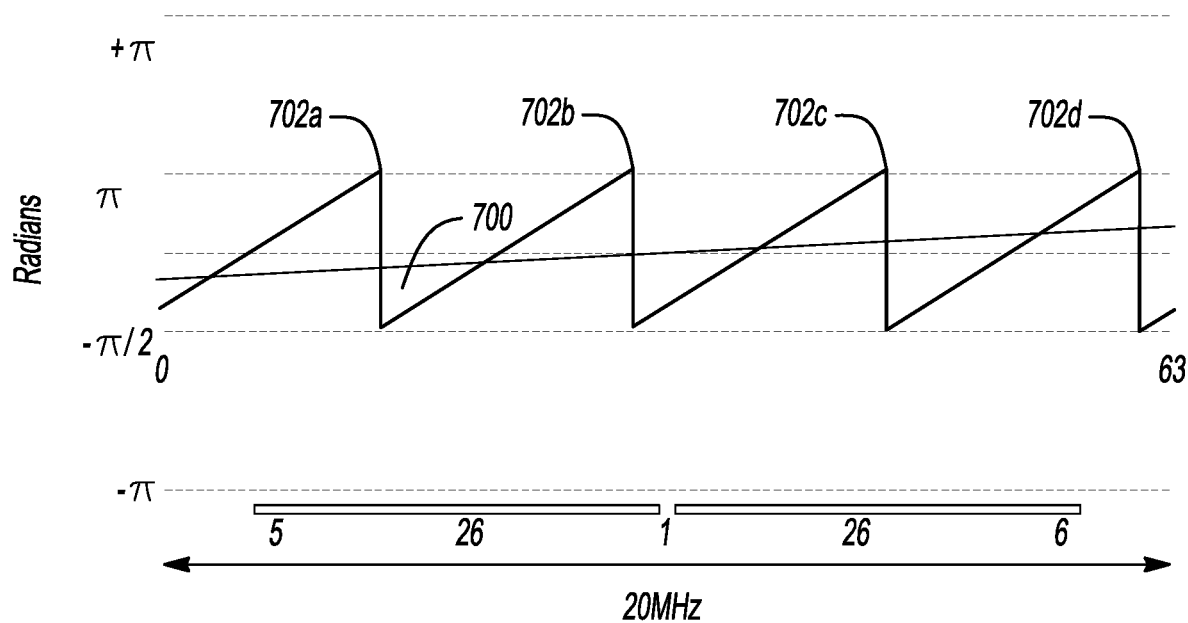

FIGS. 11 and 12 illustrate two arbitrary scenarios (e.g., time of flight (TOF) values and Direction of Departure angles) associated with the precise time detection scheme. Both of the waveforms illustrated in FIGS. 11 and 12 illustrate the TOF value and the DOD angles. It is generally not necessary to perform a coarse detection scheme prior to performing the precise time detection scheme in connection with FIGS. 11 and 12 through a crude estimation of the start of the frame is required still. Further, the slope method applied differently in the case of one transmitting antenna and two transmitting antennas. The pattern matching aspect as described above is generally equally adept at discerning between one and two transmitting antennas. In general, the TOF affects a slope 700 of the linear phase (e.g., the slope of FIG. 12 is smaller than the slope of FIG. 11). The slope of +2*¶ over 64 bins equals one 50 nsec sample delay. The sawtooth waveforms shift, regardless of the tilt (or slope 700) is a direct result of the Direction of Departure angles. In general, FIGS. 11 and 12 are two different DOD angles with (in this example) two different tilts (or slopes 700). The DOD affects the four frequency bins 702a-702d at which phase steps down by π radians. DOD amounts to horizontal cyclic shift in FIG. 12 relative to FIG. 11. The phase downstep +π/2→π/2 repeats itself four time in cases of a two antenna 135 implementation for each transmitter 122 or 124 that transmits WiFi packets (or beacons) including a standardized CDD delay of 4=64 bins/16 bins samples.

Figure 13:
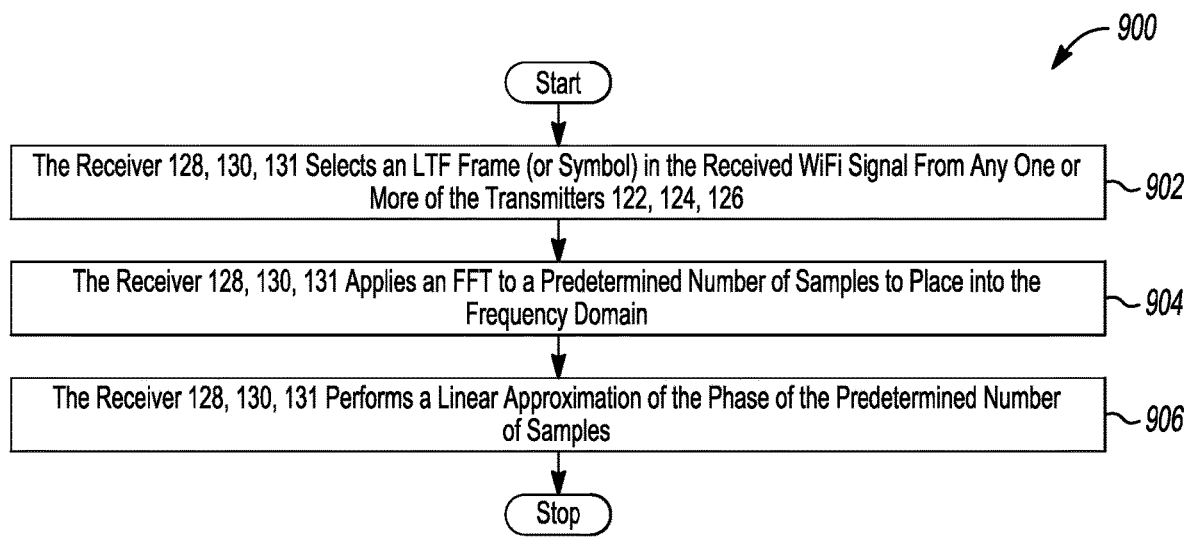
FIG. 13 depicts a method for performing interpolation to perform a fine determination of the of time of arrival of signals received at one or more of the receivers in accordance to one embodiment.

FIG. 13 depicts a method 900 for performing interpolation to estimate (in a continuous fashion) a fine determination of the of time of arrival of signals received at one or more of the receivers 128, 130, and 131 in accordance to one embodiment.

In operation 902, the receiver 128, 130, or 131 selects the LTF frame (or LTF symbol) in the received WiFi signal from any one or more of the transmitters 122, 124, 126. It is preferable to know where the LTF symbol starts and where the LTF symbol ends (e.g., it is defined via IEEE 802.11 with a duration for 64 samples (or 3.2 μs).

In operation 904, the receiver 128, 130, 131 applies an FFT to the 64 samples to provide 64 complex bins in the frequency domain.

In operation 906, the receiver 128, 130, 131 performs a linear approximation of the phase of the 64 complex bins to estimate the slope 700 (see FIGS. 11 and 12). With reference back to FIGS. 11 and 12, it is shown that the slope 700 takes into account 64 samples (e.g. 0 to 63) of the result obtained in response to performing the FFT. The slope 700 corresponds to a high-resolution time of arrival estimation relative to the local clock.

In particular, the slope 700 is proportional to a delay relative to receiver 128, 130, 131 in receiving the WiFi based signal from the transmitter 122, 124, 126. In general, the slope 700 is indicative of a resultant phase added to the sawtooth pattern of the received LTF symbol. The receiver 128, 130, 131 samples the LTF symbol and calculates an FFT to obtain a tilted saw tooth pattern as shown in FIGS. 11 and 12 in the case of two transmitting antennas. From there, the receiver 128, 130, 131 estimates the slope 700 by decimation of 16 at any arbitrary initial bin: there are three unknown parameters to the sawtooth pattern. The bin at which the first phase step occurs, the tilt and the offset of the phase once the sawtooth waves are subtracted. Decimation of the bins (e.g., taking bins 1, 17, 33, and 49) eliminates the saw tooth. Locating the best fit line (e.g., using the method of least squares may result the offset of the line and the slope of the line. The offset may be ignored and the slope shall be translated into a delay relative to the local clock by multiplying the Radians per bin slope by $(64/2\pi)*50$ ns. Again, the slope 700 provides the delay relative to the time the receiver 128, 130, 131 receives the WiFi based signal using the local clock.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for wireless communication, the system comprising:
    a first transceiver; and
    a first mobile device including a first internal clock and the first transceiver and being programmed to:
        receive a first wireless signal and a second wireless signal from a first transmitter and a second transmitter, respectively;
        process the first wireless signal and the second wireless signal based on a first internal clock associated with the first mobile device;
        determine a time of arrival (TOA) of the first wireless signal to provide a first TOA signal;
        determine the TOA of the second wireless signal to provide a second TOA signal; and
        obtain a difference between the first TOA signal and the second TOA signal to provide a first difference TOA signal that is independent of the first internal clock; and
    a second mobile device including a second internal clock that is not synchronized with the first internal clock of the first mobile device causing a drift between the first internal clock and the second internal clock, wherein the first difference TOA signal at least eliminates an unknown clock skew between the first internal clock and the second internal clock.

2. The system of claim 1, wherein the second mobile device is programmed to:
    receive the first wireless signal and the second wireless signal from the first transmitter and the second transmitter, respectively; and
    process the first wireless signal and the second wireless signal based on the second internal clock associated with the second mobile device.

3. The system of claim 2, wherein the second mobile device is further programmed to determine the TOA of the first wireless signal to provide a third TOA signal and to determine the TOA of the second wireless signal to provide a fourth TOA signal.

4. The system of claim 3, wherein the second mobile device is further programmed to obtain a difference between the third TOA signal and the fourth TOA signal to provide a second difference TOA signal that is independent of the second internal clock, wherein the first difference TOA signal and the second difference TOA signal eliminates the unknown clock skew between the first internal clock and the second internal clock.

5. The system of claim 4, further comprising:
    a server programmed to:
        receive the first difference TOA signal from the first mobile device and the second difference TOA signal from the second mobile device; and
        obtain a difference between the first difference TOA signal and the second difference TOA signal to provide a final difference signal,
    wherein the final difference signal eliminates an unknown clock skew between the first transmitter (first access point) and the second transmitter (second access point).

6. The system of claim 5, wherein the server is further programmed to generate a plurality of hyperbolas on a plane based at least on the final difference signal and at least on known locations of the second mobile device, the first transmitter, and the second transmitter.

7. The system of claim 6, wherein the server is further programmed to identify a location of the first mobile device based on an intersection formed by the plurality of hyperbolas.

8. The system of claim 5, wherein the server is further programmed to generate a plurality of hyperbolas on a plane based at least on the final difference signal and at least on known locations of the first mobile device, the second mobile device, and the second transmitter.

9. The system of claim 8, wherein the server is further programmed to determine a location of the first transmitter based on an intersection formed by the plurality of hyperbolas.

10. A method for wireless communication, the method comprising:
    receiving, at a first mobile device, a first wireless signal and a second wireless signal from a first transmitter and a second transmitter, respectively;
    processing the first wireless signal and the second wireless signal based on a first internal clock associated with the first mobile device;
    determining a time of arrival (TOA) of the first wireless signal to provide a first TOA signal;
    determining the TOA of the second wireless signal to provide a second TOA signal;
    obtaining a difference between the first TOA signal and the second TOA signal to provide a first difference TOA signal that is independent of the first internal clock; and
    receiving, at a second mobile device including a second internal clock, the first wireless signal and the second wireless signal from the first transmitter and the second transmitter, respectively,
    wherein the second internal clock is not synchronized with the first internal clock of the first mobile device causing a drift between the first internal clock and the second internal clock, and
    wherein the first difference TOA signal at least eliminates an unknown clock skew between the first internal clock and the second internal clock.

11. The method of claim 10 further comprising:
    processing the first wireless signal and the second wireless signal based on the second internal clock associated with the second mobile device.

12. The method of claim 11 further comprising:
    determining the TOA of the first wireless signal to provide a third TOA signal; and
    determining the TOA of the second wireless signal to provide a fourth TOA signal.

13. The method of claim 12 further comprising obtaining a difference between the third TOA signal and the fourth TOA signal to provide a second difference TOA signal that is independent of the second internal clock,
wherein the first difference TOA signal and the second difference TOA signal eliminate the unknown clock skew between the first internal clock and the second internal clock.

14. The method of claim 13 further comprising:
receiving, at a server, the first difference TOA signal from the first mobile device and the second difference TOA signal from the second mobile device; and
obtaining a difference between the first difference TOA signal and the second difference TOA signal to provide a final difference signal,
wherein the final difference signal eliminates an unknown clock skew between the first transmitter and the second transmitter.

15. The method of claim 14 further comprising:
generating a plurality of hyperbolas on a plane based at least on the final difference signal and at least on known locations of the second mobile device, the first transmitter, and the second transmitter.

16. The method of claim 15 further comprising identifying, at the server, a location of the first mobile device based on an intersection formed by the plurality of hyperbolas.

17. The method of claim 14 further comprising:
generating a plurality of hyperbolas on a plane based at least on the final difference signal and at least on known locations of the first mobile device, the second mobile device, the second transmitter.

18. The method of claim 17 further comprising determining a location of the first transmitter based on an intersection formed by the plurality of hyperbolas.

19. The method of claim 10 further comprising employing at least one of a discrete coarse time of arrival estimation, discrete fine time of arrival estimation, or a continuous fine time of arrival of the first wireless signal and the second wireless signal to determine the TOA of the first wireless signal and the second wireless signal at the first mobile device.

20. A computer-program product embodied in non-transitory computer readable medium that is programmed for wireless communication, the computer-program product comprising instructions to:
receive, at a first mobile device, a first wireless signal and a second wireless signal from a first transmitter and a second transmitter, respectively;
process the first wireless signal and the second wireless signal based on a first internal clock associated with the first mobile device;
determine a time of arrival (TOA) of the first wireless signal to provide a first TOA signal;
determine the TOA of the second wireless signal to provide a second TOA signal
obtain a difference between the first TOA signal and the second TOA signal to provide a first difference TOA signal that is independent of the first internal clock; and
receive, at a second mobile device including a second internal clock, the first wireless signal and the second wireless signal from the first transmitter and the second transmitter, respectively,
wherein the second internal clock is not synchronized with the first internal clock of the first mobile device causing a drift between the first internal clock and the second internal clock, and
wherein the first difference TOA signal at least eliminates an unknown clock skew between the first internal clock and the second internal clock.

21. A system for wireless communication, the system comprising:
a first mobile device including a first local clock and being programmed to:
receive a first wireless signal and a second wireless signal from a first transmitter and a second transmitter, respectively;
determine a time of arrival (TOA) of the first wireless signal to provide a first TOA signal;
determine the TOA of the second wireless signal to provide a second TOA signal; and
obtain a difference between the first TOA signal and the second TOA signal to provide a first difference TOA signal that is independent of the first internal clock;
a second mobile device including a second local clock that is not synchronized with the first internal clock of the first mobile device causing a drift between the first internal clock and the second internal clock,
wherein the first difference TOA signal at least eliminates an unknown clock skew between the first internal clock and the second internal clock, and
wherein the second mobile device is programmed to:
determine a time of arrival (TOA) of the first wireless signal to provide a third TOA signal;
determine the TOA of the second wireless signal to provide a fourth TOA signal; and
a server being programmed to:
receive first information corresponding to the first TOA signal and to the second TOA signal from the first mobile device;
receive second information corresponding to the third TOA signal and to the fourth TOA signal from the second mobile device; and
identify a location of at least one of:
the first mobile device based on at least the first information and the second information, and on at least known locations of the second mobile device, the first transmitter, and the second transmitter; and
the first transmitter based on at least the first information and the second information, and on at least known locations of first mobile device, the second mobile device, and the second transmitter.

* * * * *